United States Patent
de Boer et al.

(10) Patent No.: US 9,845,790 B2
(45) Date of Patent: Dec. 19, 2017

(54) METHOD FOR SELECTIVELY OPERATING A WIND TURBINE IN ACCORDANCE WITH AN OPERATING MODE

(75) Inventors: Wolfgang de Boer, Moormerland (DE); Helge Giertz, Leer (DE)

(73) Assignee: Wobben Properties GmbH, Aurich (DE)

( * ) Notice: Subject to any disclaimer, the term of this patent is extended or adjusted under 35 U.S.C. 154(b) by 707 days.

(21) Appl. No.: 14/241,331

(22) PCT Filed: Aug. 14, 2012

(86) PCT No.: PCT/EP2012/065910
§ 371 (c)(1),
(2), (4) Date: Oct. 14, 2014

(87) PCT Pub. No.: WO2013/029993
PCT Pub. Date: Mar. 7, 2013

(65) Prior Publication Data
US 2015/0054280 A1    Feb. 26, 2015

(30) Foreign Application Priority Data
Aug. 30, 2011    (DE) .......................... 10 2011 081 795

(51) Int. Cl.
F03D 7/02    (2006.01)
F03D 9/00    (2016.01)
F03D 9/25    (2016.01)

(52) U.S. Cl.
CPC .............. *F03D 9/002* (2013.01); *F03D 7/028* (2013.01); *F03D 7/0224* (2013.01); *F03D 9/25* (2016.05); *Y02E 10/723* (2013.01)

(58) Field of Classification Search
CPC ........ F03D 7/0224; F03D 7/028; F03D 9/002; Y02E 10/723
See application file for complete search history.

(56) References Cited

U.S. PATENT DOCUMENTS 5,418,446 A    5/1995    Hallidy
6,891,281 B2    5/2005    Wobben
(Continued)

FOREIGN PATENT DOCUMENTS

CL    46-91987    5/1988
CN    101182831 A    5/2008
(Continued)

OTHER PUBLICATIONS

Prillwitz, F., et al. "Primarregelung mit Windkraftanlagen", ETG-Workshop Neue Dezentrale Versorgungsstrukturen, Feb. 19-20, 2003, 6 pages.
(Continued)

*Primary Examiner* — Tulsidas C Patel
*Assistant Examiner* — S. Mikailoff
(74) *Attorney, Agent, or Firm* — Seed IP Law Group LLP

(57) ABSTRACT

A method of operating a wind power installation selectively in a first or second operating mode is disclosed. In the first operating mode, the installation generates as much electrical power as possible based on the prevailing wind and design of the wind power installation, and in the second operating mode generates less electrical power than in the first operating mode. The wind power installation is controlled in the first and second operating modes with first and second adjustment parameter sets, respectively. When the installation is operated in the second operating mode the maximum power which can be generated with the first adjustment parameter set or a differential power between the maximum power and a power currently generated in the second operating mode may be ascertained. The second adjustment parameter set may be selected based on a desired power reduction and the maximum power.

12 Claims, 6 Drawing Sheets

(56) References Cited

U.S. PATENT DOCUMENTS

| | | | |
|---|---|---|---|
| 7,566,982 | B2 | 7/2009 | Voss |
| 7,704,043 | B2 | 4/2010 | Kabatzke et al. |
| 7,898,100 | B2 * | 3/2011 | Andersen ............... F03D 7/0224 290/43 |
| 8,301,313 | B2 | 10/2012 | Wobben |
| 8,332,077 | B2 | 12/2012 | Kondo et al. |
| 8,793,027 | B2 | 7/2014 | Nyborg et al. |
| 8,903,555 | B2 * | 12/2014 | Nakashima ........... F03D 7/0284 290/44 |
| 9,115,695 | B2 * | 8/2015 | Bech ..................... F03D 7/0276 |
| 2003/0155773 | A1 | 8/2003 | Wobben |
| 2008/0030027 | A1 * | 2/2008 | Erdman ................ F03D 7/0224 290/40 R |
| 2008/0116690 | A1 | 5/2008 | Kabatzke et al. |
| 2009/0108582 | A1 * | 4/2009 | Seibers .................... F03D 7/02 290/44 |
| 2009/0295159 | A1 * | 12/2009 | Johnson ................ F03D 7/0224 290/44 |
| 2010/0090464 | A1 * | 4/2010 | Egedal .................. F03D 7/0224 290/44 |
| 2010/0286835 | A1 * | 11/2010 | Nyborg ................ F03D 7/0224 700/287 |

FOREIGN PATENT DOCUMENTS

| | | |
|---|---|---|
| DE | 19532409 A1 | 3/1997 |
| DE | 100 22 974 A1 | 11/2001 |
| DE | 103 00 733 B3 | 7/2004 |
| DE | 10 2009 037 239 A1 | 2/2011 |
| DE | 10 2010 026 299 A1 | 1/2012 |
| EP | 2 275 674 A2 | 1/2011 |
| JP | 6339500 A | 2/1988 |
| JP | 5-100696 A | 4/1993 |
| JP | 201084545 A | 4/2010 |
| JP | 2011-158418 A | 8/2011 |
| RU | 2350778 C2 | 3/2009 |
| RU | 2351795 C2 | 4/2009 |
| WO | 9427361 A1 | 11/1994 |
| WO | 0073652 A1 | 12/2000 |
| WO | 2010/000648 A2 | 1/2010 |

OTHER PUBLICATIONS

Office Action, dated Mar. 3, 2015, for Japanese Patent Application No. 2014-527579, with English translation (7 pgs.).

Prillwitz, F., et al. "Primarregelung mit Windkraftanlagen", ETG-Workshop Neue Dezentrale Versorgungsstrukturen, Feb. 19-20, 2003, with English translation (8 pgs.).

* cited by examiner

METHOD FOR SELECTIVELY OPERATING A WIND TURBINE IN ACCORDANCE WITH AN OPERATING MODE

BACKGROUND

Technical Field

The present invention concerns a method of operating a wind power installation as well as a wind power installation and a wind park having a plurality of wind power installations.

Description of the Related Art

Wind power installations and methods of operating same have long been known. FIG. 1 shows by way of example such a wind power installation having a pylon with a pod and a generator. The pod includes a rotor with rotor blades which are moved by the wind to generate electric current with the generator.

Usually wind power installations are used to convert kinetic energy from the wind into electrical energy and to feed it in the form of electric current into an electric network which also in simplified form can be referred to as an electric mains or just mains. Nowadays wind power installations have become established and can also be used to support the electric network. In particular wind power installations which provide for feeding electric current into the network by way of an inverter are distinguished by their capability of being able to react very quickly to changes in the network.

Depending on the respective situation in the network, network support can mean for example that a wind power installation or correspondingly a wind park with a plurality of wind power installations reduces the power to be fed into the network if there is an in particular short-term excessive supply of energy in the network. Conversely, the wind power installation or the wind park can also feed additional power into the power network in a very short-term fashion in expectation of a short-term lack of supply of energy, that is to say in particular in expectation of a short-term, in particular abrupt rise in power consumption, that is to say the power is utilized. That is possible for example in that, with that expectation, the wind power installation or the entire wind park is operated at reduced power, that is to say prior to the expected event less power is fed into the network than would be possible on the basis of the design of the wind power installation in question and the prevailing wind.

Initial proposals for network support have been set forth for example in laid-open application DE 100 22 974, also published in U.S. Patent Publication 2003/155773. In accordance therewith it was proposed that the fed-in power is reduced in dependence on the frequency in the network, which can be an indicator of oversupply or undersupply of power in the network. Such a power reduction however suffers from the disadvantage that the power reduction means that less power is fed into the network than is available in the prevailing wind. In other words, power is thrown away. The wind power installation operators are frequently entitled to receive remuneration for that thrown-away power or at least to receive corresponding compensation. For example, under the Renewable Energy Law (EEG) from the year 2000 in Germany with subsequent adapting alterations a network operator is obliged to provide recompense for power available from regenerative energy sources like wind power installations.

In the case of wind power installations therefore there is the problem of precisely determining the available power because the network operator does not want to provide excessive remuneration nor does the wind power installation operator want to receive too little remuneration. A wind power installation which feeds less power into the network than is available from the prevailing wind is however operated in a reduced mode. The optimum operating point at which so much power is taken from the wind prevailing at that time is thus a notional operating point in the case of the wind power installation operated in a reduced mode.

In principle an optimum operating point can be associated with each wind speed. It will be noted however that this presupposes accurate measurement of the wind speed, which for various reasons is frequently a theoretical, at least extremely inaccurate option. A modern wind power installation has a large rotor diameter. For example the E126 from Enercon has a rotor diameter of 126 m. In that case the rotor sweeps over an area of about 10,000 sq. m ($m^2$). There is in practice not a uniform wind speed over those 10,000 sq. m—quite apart from gusts and other variations in wind speed with time. At the same time a rotor diameter of 126 m also means a difference in height of the swept region of 126 m. The use of a wind speed measurement procedure for determining the available power of the wind power installation in question is therefore at least problematical, if not even inappropriate. In the case of a hub height of 137 m there is a difference of height at which the rotor is operative of 74-200 m. Basically the rotor of a wind power installation is the sole suitable means for detecting the relevant speed.

In general attention is directed to DE 103 00 733 B3, EP 2 275 674 A2, DE 100 22 974 A1 and DE 10 2010 026 299 A1.

BRIEF SUMMARY

Therefore one or more embodiments of the present invention is to address at least one of the above-mentioned problems and in particular solve it. In particular one embodiment of the invention seeks to provide a solution for observing, controlling and/or detecting a power difference as accurately and reliably as possible, namely the power difference between the power which is currently being generated and the power which can be generated at a maximum in consideration of the factors involved. Generated power and maximum generatable power means in particular the electric power which is or could be delivered by the wind power installation for the feed. At least the invention seeks to find an alternative solution.

According to one embodiment of the invention there is proposed a method according to claim 1. In accordance therewith there is proposed a method of operating a wind power installation for generating electric power from wind, wherein the wind power installation is operated selectively in a first or a second operating mode, that is to say it can be operated in both modes. The first operating mode is one in which the wind power installation generates as much electric energy or power as is possible because of the prevailing wind and the design of the wind power installation. Purely as a precaution it is pointed out that naturally energy cannot be produced but can only be converted. It has proven to be practicable however to refer to such conversion as energy generation. The second operating mode is one in which the wind power installation generates less electric power than in the first operating mode.

A first adjustment parameter set is taken as the basis for operation of the wind power installation in the first operating mode and correspondingly a second adjustment parameter set is taken as the basis for operation in the second operating mode. The first and second adjustment parameter sets are thus respectively used to control the wind power installation in dependence on wind speed. For example the respective operating parameter set can describe an operating characteristic curve. The fact that the wind power installation is operated in wind speed-dependent relationship on the basis of that curve does not necessarily mean—although that would be possible—that the wind speed is measured for that purpose. Rather, the wind speed is frequently only detected by way of the reaction of the wind power installation or thereby exerts an influence. Although a wind speed can often be associated with the wind power installation by way of such an operating characteristic curve by way of example in respect of the operating performance it is frequently also possible that the wind speed is nonetheless not known as a value or at least would not have to be known.

If now the wind power installation is operated in the second operating mode, that is to say at reduced power, then the power which can be generated at a maximum with the first adjustment parameter set or a differential power as the difference between that power which can be generated at the maximum and the reduced power which is currently being generated is ascertained. That ascertaining process is effected in dependence on the second adjustment parameter set. That means that the second adjustment parameter set is ascertained in particular having further regard to the current installation performance, that is to say for example the rotor speed of rotation which is occurring and/or the generated power which is involved. In particular the currently prevailing wind speed does not have an influence or a significant influence on that ascertaining procedure.

In addition or alternatively the second adjustment parameter set is selected in dependence on a desired power reduction, namely a power reduction by which a power to be generated by the wind power installation is to be reduced in relation to the power which can be generated at a maximum by the wind power installation at the time. Here this basically involves the same notion, namely that the selected second adjustment parameter set reflects items of information and in particular precise information about the power which can be generated, in comparison with the power which can be generated as the maximum.

In that respect it is also to be emphasized that a distinction is drawn between a first and a second operating mode and usually a fixed adjustment parameter set forms the basis for the first operating mode at any event for the specific wind power installation. The second operating mode is based on another adjustment parameter set which however can be varied or selected. Thus for example a second adjustment parameter set can be one in which the power is reduced in relation to the power which can be generated at a maximum, by a relative value such as for example 10% or an absolute value such as for example 200 kW. Thus, different adjustment parameter sets can be used for different power reductions, whether now they are absolute or relative or predetermined in some other fashion.

If for example the second adjustment parameter set used is one in which the generated power is 300 kW below the maximum power which can be generated, it is clear solely on the basis of the selected second adjustment parameter set that the differential power is 300 kW, that is to say at the time a corresponding remuneration can be due for 300 kW. Naturally that presupposes that there is so much wind that the installation can actually be operated at all with the 300 kW given by way of example, that is to say power is generated at all in the second operating mode. It will be appreciated that this aspect moreover also has to be taken into consideration for a safety shut-down and other shut-down procedure.

If for example the basis adopted is an adjustment parameter set with which a relative power difference such as for example 20% below the maximum power is associated then the differential power can change and has to be determined having regard to the electric power generated. If therefore the wind power installation generates 800 kW with that second adjustment parameter set given by way of example, the maximum power which can be generated is 1 MW.

Preferably therefore the method is characterized in that the power which can be respectively generated at a maximum on the basis of the prevailing wind and the design of the wind power installation with the first adjustment parameter set is associated with the second adjustment parameter set.

Preferably a first and a second operating characteristic curve is respectively associated with the first and/or second parameter set or the parameter set specifies such a curve, in particular a rotary speed power characteristic curve.

Adjustment of the wind power installation by way of a rotary speed power characteristic curve involves in particular the part-load range, that is to say the range in which the nominal powers for which the wind power installation is designed cannot be generated on the basis of prevailing wind speeds. In the case of variable-speed wind power installations with an adjustable rotor blade angle, which is usually the basic starting point adopted in the present application, a fixed rotor blade angle is frequently set in the part-load range. The wind power installation then rotates because of the wind and the set rotor blade angle and that rotary speed is detected. A power associated with that rotary speed is then set on the basis of the stored rotary speed power characteristic curve. That set and therefore delivered power correspondingly brakes the rotor by way of the generator so that that power has an influence on the speed of rotation of the rotor. If now the speed of rotation of the rotor further increases, just to give an example, then the power is also further increased until arriving at an operating point at which the speed of rotation of the rotor does not increase any further. That then corresponds to an operating point which is determined by the speed of rotation and a power, and which is found again in the stored rotary speed power characteristic curve. In that way the operating point basically is continuously adjusted and possibly altered to track changing wind speeds. In that respect the described method does not need express measurement of the wind speed, but operates only by way of detection of the rotary speed and the setting of the power which in that way is naturally also detected.

Preferably, for such a wind power installation control system or another suitable system, a first rotor blade angle is taken as the basis for the first adjustment parameter set and a second rotor blade angle is taken as the basis for the second adjustment parameter set, and is appropriately set. On the assumption that the second rotor blade angle which can also be variable or which can also turn out to be different for different second adjustment parameter sets, permits a lower level of power yield from the wind than the first rotor blade angle, a power reduction can be achieved by way thereof. Preferably the rotor blade angle of the second adjustment parameter set has a low Coefficient of Power (CP) value. Preferably the wind power installation is operated at a lower level of efficiency in the second operating mode. In the second operating mode therefore the ratio of generated power to power taken is worse or lower. That can be achieved for example by the use of a rotor blade angle with worse or lower CP value.

Preferably the power which can be generated with the first adjustment parameter set and which is associated with the second adjustment parameter is previously obtained entirely or partially by comparative measurements, interpolation and/or extrapolation. In particular measurement is effected in respect of the installation performance with the first adjustment parameter set and with the second adjustment parameter set. That can be effected for example in such a way that the wind power installation is successively operated both with the first and with the second adjustment parameter set under identical wind conditions in order thereby to establish the relationships. That can be repeated to increase accuracy and reliability and can be correspondingly carried out for different wind conditions and can also be repeated there. Intermediate values can be interpolated or extrapolated.

Another or additional variant provides that the CP value is accurately obtained in dependence on the respective rotor blade angle setting and the resulting installation performance is precisely acquired for that purpose. Thus for example by way of a comparison the CP value of the rotor blade angle of the first adjustment parameter set can be related to the CP value or values in accordance with the second adjustment parameter set. In that respect the CP value—expressed in simplified terms—describes a level of efficiency of the rotor blade, wherein that efficiency and thus the CP value depends on the rotor blade angle. To obtain a given relationship of the power between the first and second adjustment parameter sets, it may be meaningful if the rotor blade angle of the second adjustment parameter set—even if this concerns the part-load range is not constant. Accordingly there would be for example a first adjustment parameter set for the first operating mode for the part-load range with a constant rotor blade angle, namely the optimum one, and a second adjustment parameter set for the second operating mode with a variable rotor blade angle. Accordingly the rotor blade angle of the second adjustment parameter set would be variable with the wind speed, which in this case also does not have to make any measurement thereof necessary.

Preferably the behavior of the wind power installation is measured in particular in the part-load range in dependence on one or more rotor blade angles. Preferably one or more adjustment parameter sets, in particular rotary speed power characteristic curves, are produced therefrom as possible second adjustment parameter sets. They can then be selected depending on the respectively desired requirement, in particular depending on the respectively desired reduction in power.

In an embodiment it is proposed that the CP value is worsened in the part-load range by a predetermined value or in other predetermined fashion by suitable alteration of the rotor blade angle, and a rotor blade angle corresponding thereto, or a rotor blade angle characteristic curve corresponding thereto, is recorded. Thus for example at a worsened CP value, a wind speed-dependent rotor blade angle characteristic curve can also be recorded in the part-load range, and adopted as the basis. Such a recorded rotor blade angle or rotor blade angle characteristic curve can also be viewed as the minimum rotor blade angle for the respective reduced operating point.

The described power reduction is particularly efficient and helpful in the part-load range because it is here that difficult information can be acquired about the maximum power which can be generated. Nonetheless there are also meaningful possible uses in the full-load range. More particularly, in the case of a wind power installation operated in a reduced mode, it is no longer absolutely possible to ascertain whether it was operated in the first operating mode in the full-load range if the current operation however is effected in the second operating mode. Finally, it is generally only possible to see at all by operation of the installation whether it is in a full-load mode of operation or whether the prevailing wind is in a range in which the wind power installation can operate in the full-load mode.

In addition there is proposed a wind power installation for generating electric power from wind, wherein the wind power installation is adapted to be operated with a method according to the invention in accordance with one of the described embodiments. In particular the wind power installation has a microcontroller or other computing units with which at least one method is implemented in accordance with one of the aforementioned embodiments. Preferably a different parameter set can be associated with each wind power installation in dependence on the place of erection or can first be generated on site. In particular the adjustment parameter sets can be different for example for wind power installations which are of substantially the same structure but which are erected at different locations. Thus in particular air density and/or air humidity have an influence on the behavior of the installation and thus possibly an influence on the relationship of the different operating modes to each other.

In addition there is proposed a wind park having a plurality of wind power installations, that has at least one of the above-described wind power installations, preferably a plurality of such wind power installations, and which in particular is exclusively made up of such wind power installations. That can provide a considerable amount of feed-in power and thus also a considerable amount of regulating power, in which respect any power differences can be calculated.

Preferably adjustment parameter sets of the wind power installations of a park are related to each other so that for example it is possible to infer from the performance of a wind power installation, in particular its delivered power, and knowledge of the adjustment parameter set used there, the maximum generated power of another wind power installation.

BRIEF DESCRIPTION OF THE SEVERAL VIEWS OF THE DRAWINGS

The invention is described by way of example hereinafter by means of embodiments with reference to the accompanying Figures.

DETAILED DESCRIPTION

Hereinafter identical references or identical variable identifications belong to different specific operating situations, but basically concern identical physical components, physical parameters or adjustments.

Figure 1:
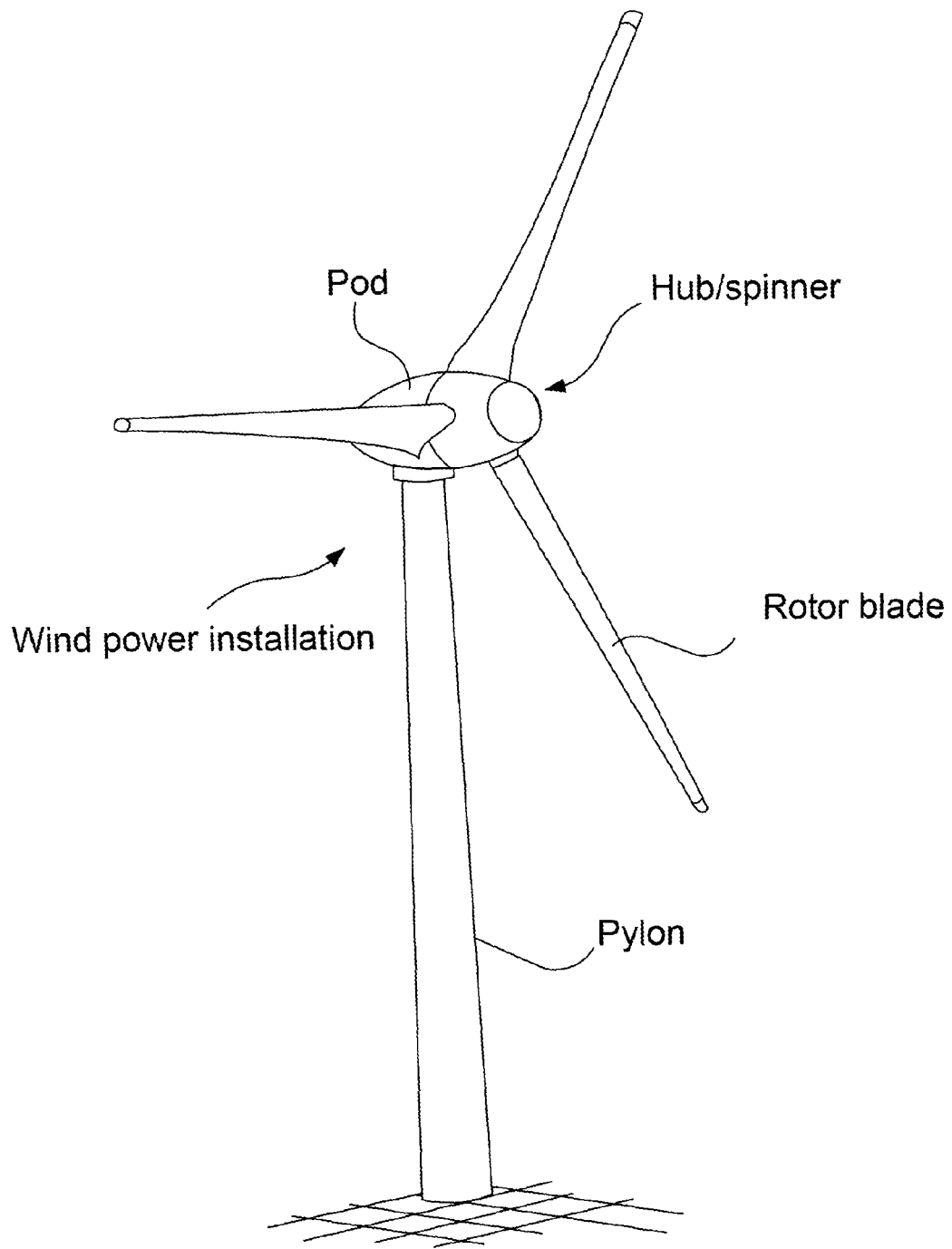
FIG. 1 shows a perspective view of a wind power installation.

FIG. 1 shows a basically known wind power installation in which a method according to the invention is implemented. The rotor blades can adjust the rotor blade angle.

Figure 2:
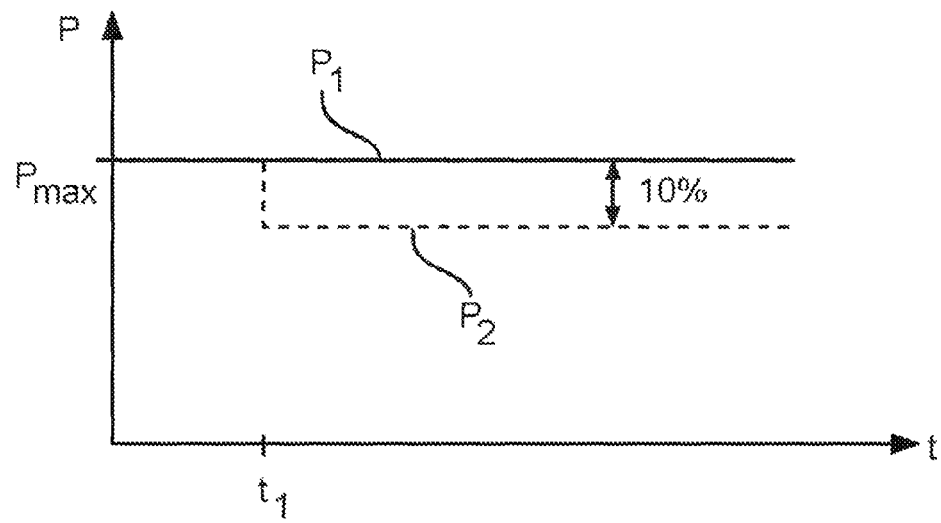
FIG. 2 diagrammatically shows a power-time graph with time-wise reduced power.

FIG. 2 shows by way of illustration and in idealizing fashion the underlying wish of reducing the power which is to be generated at a maximum with a wind power installation, by a given value. Thus a solid line shows the power $P_1$ for a first operating mode in which maximum power is generated by the wind power installation, namely the power which can be generated on the basis of the prevailing wind conditions. That can also be below a nominal power. Shown in broken line is a power characteristic curve identified by $P_2$ showing a second operating mode of the wind power installation, in which it is operated at a reduced value which is specified in FIG. 2 by way of example as 10%. That is effected from the time $t_1$. That differential power between $P_1$ and $P_2$ is to be determined in order for example to be able to recompense same or to be able to predetermine it if the wind power installation is operated in the second operating mode at the power $P_2$.

Figure 3:
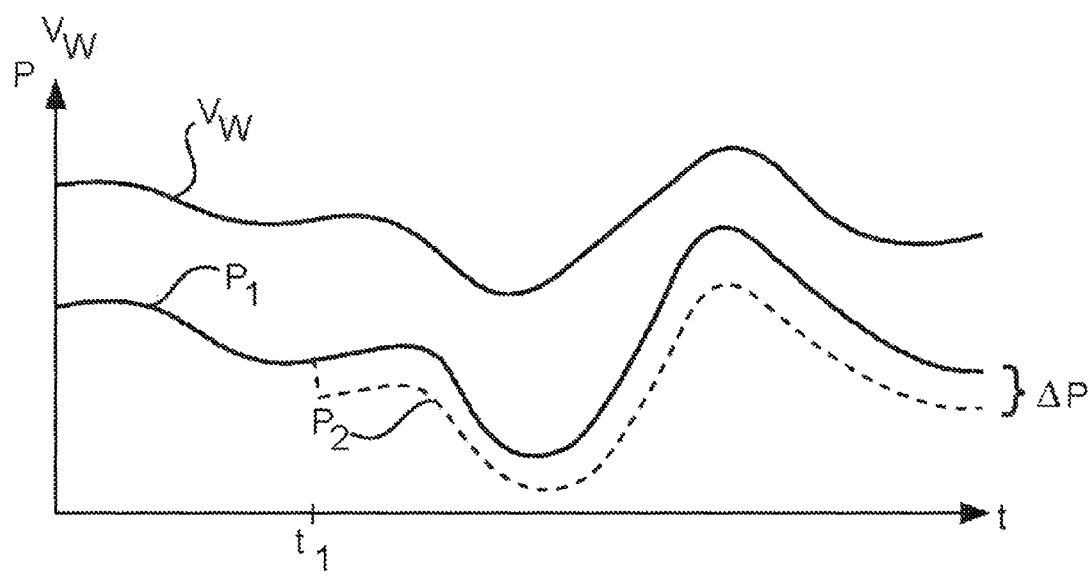
FIG. 3 diagrammatically shows a wind speed variation with associated power in dependence on time, FIG. 4 diagrammatically shows a relationship between power and wind speed for different CP values on the basis of different rotor blade angles.

FIG. 3 shows that however under real conditions it is generally not possible to assume that there is a constant wind speed and thus also a constant power. The wind speed $V_W$ is plotted there in relation to time t. To illustrate the problems involved the wind speed $V_W$ varies in height.

Shown as $P_1$ is a power characteristic curve which specifies the power which could be generated at a maximum with the prevailing wind $V_W$, with the wind power installation in question. In principle there is a cubic relationship between wind speed and the power which can be generated therefrom. That non-linear relationship is intended to be discernible in FIG. 3. Nonetheless FIG. 3 only diagrammatically shows the power variation $P_1$ to illustrate the problems. At the time $t_1$ there is a reduction in the maximum power $P_1$ which can be generated, to the reduced power $P_2$. The reduction implemented is identified by $\Delta P$.

FIG. 3 clearly shows that determining the differential power with a fluctuating wind and thus fluctuating initial power output is difficult.

Figure 4:
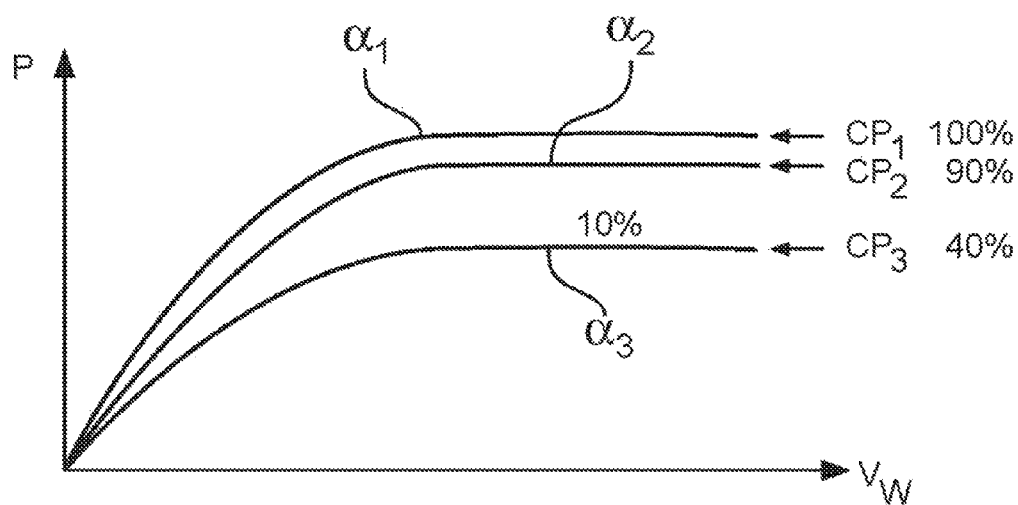

As a solution, it is proposed that different rotor blade angles, namely $\alpha 1$, $\alpha 2$ or $\alpha 3$, be set, even in the part-load range. FIG. 4 shows the differing height of the power which can be generated in dependence on the wind speed and in dependence on the choice of the rotor blade angle, in which respect the rotor blade angles $\alpha 1$, $\alpha 2$ and $\alpha 3$ are also shown only by way of example here. Accordingly a different CP value is plotted for each rotor blade angle. In that respect, the CP value CP1=100% is assumed for the rotor blade angle $\alpha 1$, that is to say the maximum achievable CP value. In comparison the rotor blade angle $\alpha 2$ is slightly altered and has a CP value which is slightly reduced, namely CP2=90%, accordingly CP2 is 90% below the value of CP1 which is adopted here as the basic value. For the further configuration shown by way of example for the rotor blade angle $\alpha 3$, that gives a CP3=40%.

Accordingly FIG. 4 not only shows that wind speed-dependent differing powers can be achieved depending on the respective rotor blade angle set, but also that a relationship which is at any event is basically known can be adopted as a basic starting point. It will be noted however that possibly such a relationship has to be determined for the specific installation. It will be appreciated that here too there can be slight deviations, if it is taken into consideration that the wind speed is not the same either for different locations or for different times.

Nonetheless a quite good association of the power is possible in wind speed-dependent relationship with different rotor blade angles. Accordingly it is possible to infer from a power at a rotor blade angle, for example $\alpha 2$, the power which could be produced in the situation upon setting the rotor blade angle $\alpha 1$.

Figure 5:
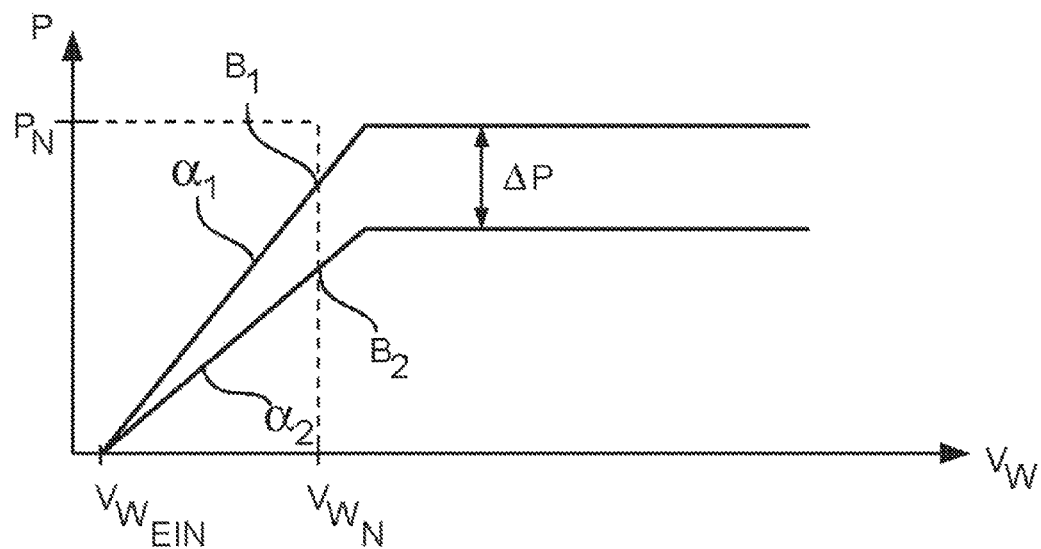
FIG. 5 shows two possible power variations for different rotor blade angles in dependence on wind speed.

A corresponding implementation is shown in FIG. 5 illustrating two possible wind speed-dependent power characteristic curves. Both characteristic curves, namely that associated with the rotor blade angle $\alpha 1$ and that associated with the rotor blade angle $\alpha 2$, start at the wind speed $V_{ACTIVATE}$, at which the wind power installation is switched on and which specifies the beginning of the part-load range. Both power characteristic curves then rise to the nominal wind speed $V_{WN}$ which specifies the end of the part-load range which is thus between $V_{ACTIVATE}$ and $V_{WN}$. The linear configuration of the two characteristic curves is only by way of illustration. The power characteristic curve for $\alpha 2$ concerns a second operating mode in which the wind power installation is operated in a reduced mode. The characteristic curve in respect of the rotor blade angle $\alpha 1$ identifies a non-reduced mode. For, in the illustrated embodiment, a differential power $\Delta P$ is shown, which is approximately constant for the full-load range, that is to say for wind speeds above $V_{WN}$, but is proportional to the respective power for the part-load range.

FIG. 5 is intended to show in that respect that there can be two characteristic curves depending on the set rotor blade angle. Those characteristic curves are plotted in dependence on the wind speed and are basically known. If a power point is set for example on the characteristic curve relating to the rotor blade angle $\alpha 2$, the corresponding operating point of the other curve can be directly determined because both curves are known. As an example for that purpose the operating points B2 for use of the rotor blade angle $\alpha 2$ and the corresponding operating point B1 of the curve for the rotor blade angle $\alpha 1$ are plotted. When therefore the operating point B2 occurs the operating point B1 and thus the maximum power which can be generated can be directly ascertained or read off from the characteristic curve. Although the illustration is in dependence on the wind speed $V_W$ there is no need for express knowledge or designation of the underlying wind speed. Therefore the operating point B2 can be set without knowledge of the wind speed and the operating point B1 can be ascertained and that can also directly give the differential power $\Delta P$.

It is thus possible to advantageously react to requirements from network operators, namely to reserve a percentage active power of the current fed-in active power, which can be released again for network support in critical network situations, in particular in the case of an underfrequency. In addition the following can also be explained by way of example.

Reserving active power in dependence on the currently prevailing feed-in power is difficult in the case of wind power installations in the part-load range. The aerodynamic conditions at the installation are altered by downward regulation of the installation, which possibly makes it almost impossible to detect the real wind speed and the possible feed-in power resulting therefrom.

An active power reserve power at the installation level and at the wind park level can also be achieved and possibly even guaranteed in the part-load mode of operation, by artificially targetedly controlled worsening of the level of efficiency of the installation, that is to say the wind power installation. In the nominal load mode of operation an upper limit is imposed, that is to say the provision of a reserve, by limiting the maximum power.

Thus entire wind power plants can be operated with a reserve power controlled centrally by way of the SCADA system. The release of reserve power can be implemented for example at the network frequency, thus being established on the basis thereof. The network frequency is basically the same everywhere in the network and a threat of underfrequency signals a collapsing electrical network.

The worsening of the level of efficiency in the part-load range is achieved by targetedly setting the minimum blade angle, that is to say targetedly setting the rotor blade angle in the part-load range. As a one-off procedure for each type of installation or for each blade profile in the case of a series installation, but possibly also for each individual installation, rotary speed-dependent characteristic curves are measured for the minimum blade angle, those curves reflecting the respective percentage reserve powers. That reserve power can in that respect also be interpreted as or identified as the differential power between the maximum power which can be generated, and the power which is reduced in the case of providing a reserve power.

The proposed solution can also be inexpensively used insofar as possibly only a one-off software implementation may be required.

It is to be mentioned that almost all network operators are in the meantime demanding that installations automatically react or can react to changes in frequency in the network with a change in power. As the requirements of the network operators can be very different, it may be necessary to introduce a large number of new parameters which are then to be set by way of example or in part only at the installation display.

When using a program in accordance with an embodiment of the invention, initialization of the frequency-dependent power regulation which satisfies the requirements of most network operators is firstly automatically implemented as a one-off procedure. It will be noted however that it may be necessary to check, in co-operation with a network operator at each installation, whether the settings correspond to the requirements of the network operator.

At the display of the installation there is then the possible option of switching frequency regulation on and off. When it is switched on it is possible to select whether the installation is to react to a frequency deviation dynamically or statically.

In dynamic regulation the power of the installation is lowered when the predetermined frequency is exceeded with a given gradient thus—for example a given percentage value per second—and raised again if the frequency falls below the limit value again.

In static regulation the power is regulated proportionally to the frequency, depending on which respective frequency limits and which associated power values are set.

Some network operators require a so-called 'return frequency'. That is generally only a little above the nominal frequency. That return frequency provides that the installation initially only reduces the power upon a rise in frequency. It is only if the frequency falls below the return frequency again that the power is increased again. If the return frequency is set higher than the uppermost downward regulation frequency, it is ineffective.

It is also possible to set whether frequency regulation is to operate in dependence on the nominal installation power or the current installation power. If the nominal power is selected as the reference point then all target values of the frequency-dependent power regulation are related to that power. In other words, if an installation for example is still to make 50% power at 51 Hz, that would correspond to a P-MAX (f) of 1000 kW at a nominal power of 2 MW. If however the installation only runs 500 kW because of little wind, that would have no influence on the installation power and the installation would thus not make any contribution to frequency regulation.

If the current installation power is selected as the reference point, then the installation power is stored as 100% value at the moment when frequency regulation begins. Upon a further rise in frequency P-MAX (f) is related to that value. In other words, from the above example, the installation would only still make 250 kW at 51 Hz and thus would make a contribution to stabilization of the network frequency independently of the prevailing supply of wind.

A point in frequency regulation is the so-called reserve power which has already been partly described. In that case the installation is operated in the region of the nominal frequency at reduced power. In the case of nominal wind that is effected by limiting P-MAX. In the part-load mode of operation the installation is operated with a blade angle which represents the required regulating reserve. The regulating reserve can therefore be read off from the blade angle. If now the network frequency falls below a given value of for example 49.5 Hz then the installation automatically increases the power and thus supports the network frequency. That reserve power represents an option which is only used in rare cases. For, if an installation has to constantly reserve power, that signifies high yield losses under some circumstances. With active park regulation the reserve power can also be predetermined by the park computer.

Figure 6:
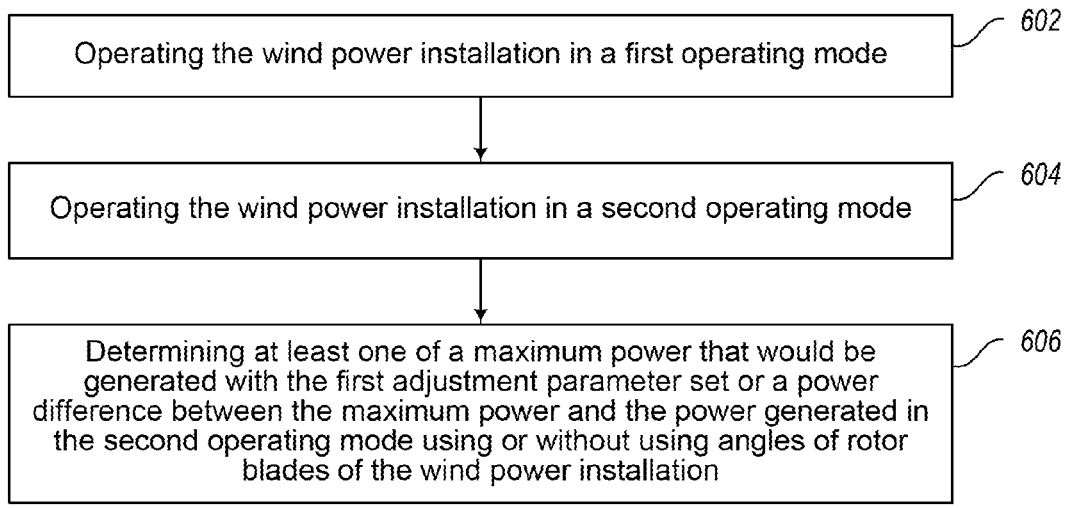
FIG. 6 shows a method of operating a wind power installation.

FIG. 6 shows a method of operating a wind power installation. At 602, the wind power installation is operated in a first operating mode. At 604, the wind power installation is operated in a second operating mode. At 606, at least one of a maximum power that would be generated with the first adjustment parameter set or a power difference between the maximum power and the power generated in the second operating mode is determined using or without using angles of rotor blades of the wind power installation.

Figure 7:
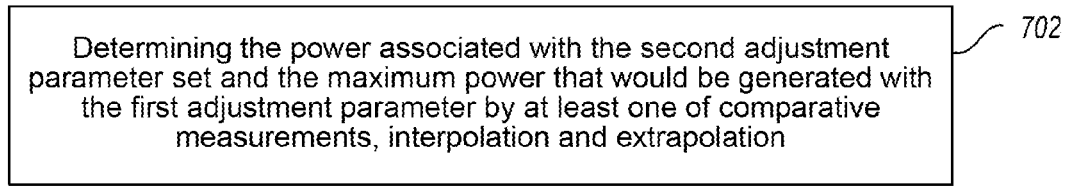
FIG. 7 shows a method of determining power associated an adjustment parameter set.
Figure 8:
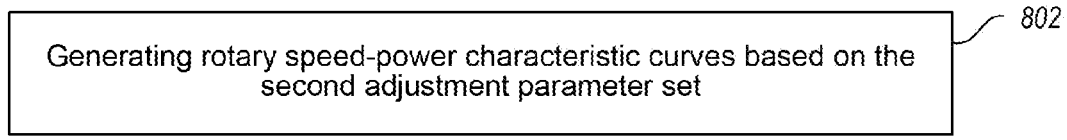
FIG. 8 shows a method of generating rotary speed-power characteristic curves.

FIG. 7 shows a method of determining power associated an adjustment parameter set. At 702, the power associated with the second adjustment parameter set and the maximum power that would be generated with the first adjustment parameter are determined by at least one of comparative measurements, interpolation and extrapolation. FIG. 8 shows a method of generating rotary speed-power characteristic curves. At 802, rotary speed-power characteristic curves are generated based on the second adjustment parameter set.

Figure 9:
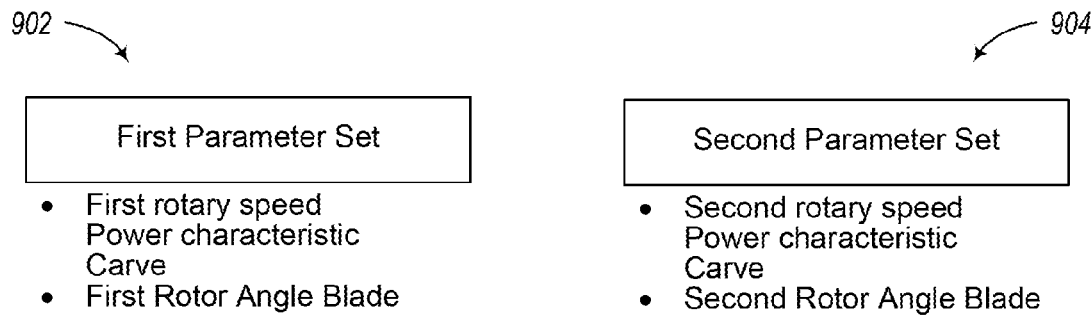
FIG. 9 an example of a parameter set.

FIG. 9 an example of parameter sets. A first parameter set 902 includes a first rotary speed power characteristic curve and a first rotor angle blade. A second parameter set 904 includes a second rotary speed power characteristic curve and a second rotor angle blade.

Figure 10:
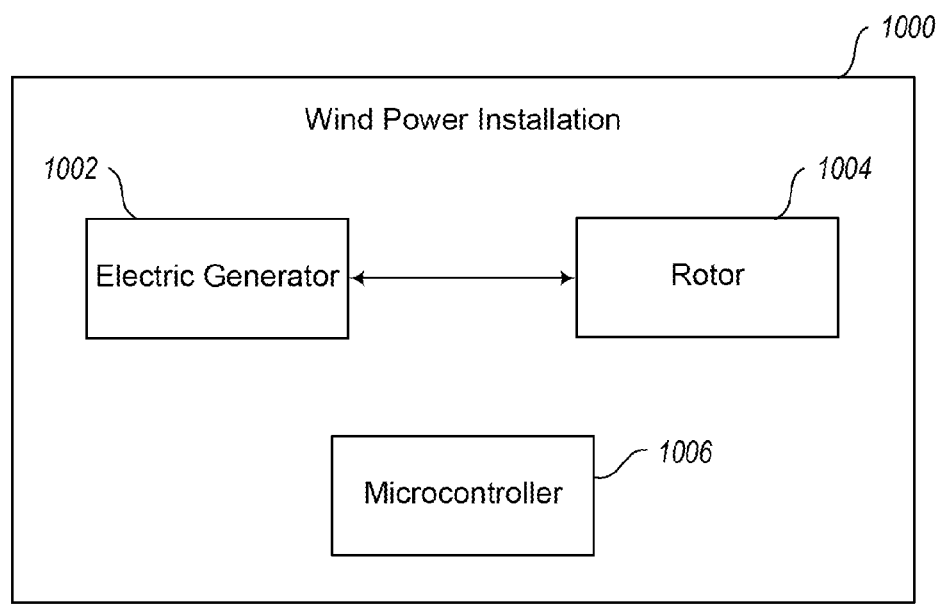
FIG. 10 shows an example of a wind power installation.
Figure 11:
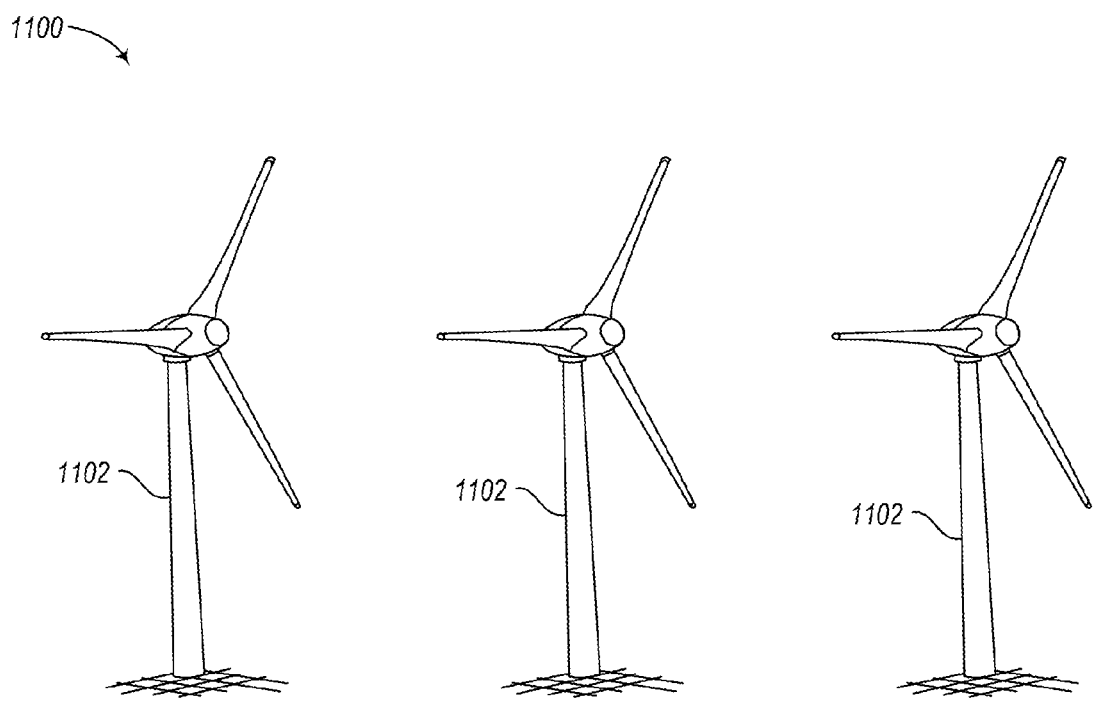
FIG. 11 shows an example of a wind park.

FIG. 10 shows an example of a wind power installation. The wind power installation 1000 includes an electric generator 1002 coupled to a rotor 1004. The wind power installation 1000 includes a microcontroller 1006. FIG. 11 shows an example of a wind park. The wind park 1100 includes a plurality of wind power installations 1102.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a wind power installation, the method comprising:
    in a first time period, operating the wind power installation in a first operating mode that maximizes an amount of electrical power generated based on prevailing wind and design constraints of the wind power installation, wherein the wind power installation is controlled in the first operating mode with a first adjustment parameter set;
    generating the maximized amount of electrical power;
    in a second time period different than the first time period, operating the wind power installation in a second operating mode that generates less electrical power than in the first operating mode, wherein the wind power installation is controlled in the second operating mode with a second adjustment parameter set different from the first adjustment parameter set, wherein the second adjustment parameter set is selected in dependence on a desired power reduction;
    generating power in the second operating mode;
    when the wind power installation is operated in the second operating mode, determining at least one of a maximum power that would be generated with the first adjustment parameter set or a power difference between the maximum power that would be generated with the first adjustment parameter set and the power generated in the second operating mode in dependence on the second adjustment parameter set, wherein at least one of the first adjustment parameter set specifies a first rotary speed-power characteristic curve and the second adjustment parameter set specifies a second rotary speed-power characteristic curve; and
    in response to a demand for increased electrical power in a network, operating the wind power installation in the first operating mode with the first adjustment parameter set that maximizes the amount of electrical power generated based on the prevailing wind and the design constraints of the wind power installation.

2. The method according to claim 1, further comprising:
    generating a respective maximized power associated with the second adjustment parameter set based on a prevailing wind and the design constraints of the wind power installation when the wind power installation is operated in the second operating mode.

3. The method according to claim 1 wherein the wind power installation has rotor blades with an adjustable rotor blade angle, and wherein the first adjustment parameter set further specifies a first rotor blade angle and the second adjustment parameter set further specifies a second rotor blade angle that is different than the first rotor blade angle.

4. The method according to claim 3 wherein the second rotor blade angle has a lower coefficient of power value than the first rotor blade angle, and wherein operating the wind power installation in the second operating mode with the second adjustment parameter set results in a lower level of efficiency than operating the wind power installation in the first operating mode with the first adjustment parameter set.

5. The method according to claim 1 wherein determining the maximum power that would be generated with the first adjustment parameter set is entirely or partially performed beforehand by at least one of comparative measurements, interpolation and extrapolation.

6. The method according to claim 3 wherein the power generated in the second operating mode is dependent on the second rotor blade angle, wherein the second rotor blade angle is variable.

7. The method according to claim 6 further comprising generating rotary speed-power characteristic curves based on the second adjustment parameter set.

8. A wind power installation for generating electrical power from wind, the wind power installation comprising:
    a rotor;
    a rotor blade coupled to the rotor;
    an electric generator coupled to the rotor; and
    a microcontroller configured to control the wind power installation, the microcontroller further configured to:
        in a first time period, operate the wind power installation in a first operating mode that maximizes an amount of electrical power generated based on prevailing wind and design constraints of the wind power installation, wherein the wind power installation is controlled in the first operating mode with a first adjustment parameter set;
        in a second time period different than the first time period, operate the wind power installation in a second operating mode that generates less electrical power than in the first operating mode, wherein the wind power installation is controlled in the second operating mode with a second adjustment parameter set different from the first adjustment parameter set, wherein the second adjustment parameter set is selected in dependence on a desired power reduction;
        when the wind power installation is operated in the second operating mode, determining a power difference between a maximum possible power that would be generated if the wind power installation were operating in the first operating mode and the power generated in the second operating mode, wherein at least one of the first adjustment parameter set specifies a first rotary speed-power relationship and the second adjustment parameter set specifies a second rotary speed-power relationship; and
        in response to a demand for increased electrical power in a network, operating the wind power installation in the first operating mode with the first adjustment parameter set that maximizes the amount of electrical power generated based on the prevailing wind and the design constraints of the wind power installation.

9. A wind park comprising a plurality of wind power installations according to claim 8.

10. The wind power installation according to claim 8, wherein the microcontroller is configured to determine the power generated in the second operating mode based on an average speed of the rotor and an angle of the rotor blade in relation to an axis.

11. The wind power installation according to claim 8 wherein the power difference is determined without direct measurement of a wind speed.

12. The wind power installation according to claim 8 wherein the microcontroller is coupled to the electric generator.

* * * * *